United States Patent
Neystadt et al.

(10) Patent No.: US 10,958,624 B2
(45) Date of Patent: *Mar. 23, 2021

(54) PROXY AUTO-CONFIGURATION FOR DIRECTING CLIENT TRAFFIC TO A CLOUD PROXY WITH CLOUD-BASED UNIQUE IDENTIFIER ASSIGNMENT

(71) Applicant: Akamai Technologies, Inc., Cambridge, MA (US)

(72) Inventors: Eugene ("John") Neystadt, Kfar Saba (IL); John Devasia, Coppell, TX (US); Christopher Dewar, Scotland (GB); Eyal Heiman, Tel Aviv (IL)

(73) Assignee: Akamai Technologies, Inc., Cambridge, MA (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/211,383

(22) Filed: Dec. 6, 2018

(65) Prior Publication Data

US 2020/0186501 A1    Jun. 11, 2020

Related U.S. Application Data

(63) Continuation of application No. 16/211,372, filed on Dec. 6, 2018.

(51) Int. Cl.
*H04L 29/06* (2006.01)
*H04L 29/08* (2006.01)
*H04L 29/12* (2006.01)

(52) U.S. Cl.
CPC ...... *H04L 63/0281* (2013.01); *H04L 63/0236* (2013.01); *H04L 67/02* (2013.01);
(Continued)

(58) Field of Classification Search
CPC ............ H04L 63/0281; H04L 63/0236; H04L 63/0272; H04L 63/0227; H04L 61/1511; H04L 61/256; H04L 67/2814
See application file for complete search history.

(56) References Cited

U.S. PATENT DOCUMENTS 6,820,133 B1   11/2004   Grove et al.
6,907,525 B2   6/2005    Pazi et al.
(Continued)

FOREIGN PATENT DOCUMENTS

WO    2014001773 A1    1/2014

OTHER PUBLICATIONS

Introduction to PAC Files, Find Proxy Forurl, downloaded on Nov. 9, 2018, 6 pages. http://findproxyforurl.com/pac-file-introduction.
(Continued)

*Primary Examiner* — Hosuk Song

(57) ABSTRACT

Among other things, this document describes systems, methods and devices for providing a cloud proxy auto-config (PAC) function for clients connected to a private network, such as an enterprise network. The teachings hereof are of particular use with cloud hosted proxy services provided by server deployments outside of the private network (e.g., external to the enterprise or other organizational network). This document also describes systems, methods and devices for providing a proxy auto-config (PAC) function for clients connected to a third party network, such as when the client moves outside of the enterprise network.

22 Claims, 6 Drawing Sheets

(52) U.S. Cl.
CPC .......... *H04L 67/10* (2013.01); *H04L 67/2814* (2013.01); *H04L 61/1511* (2013.01); *H04L 61/256* (2013.01)

(56) References Cited

U.S. PATENT DOCUMENTS

| | | | |
|---|---|---|---|
| 7,111,057 B1 | 9/2006 | Wein et al. | |
| 7,191,332 B1 | 3/2007 | Pankajakshan et al. | |
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,318,100 B2* | 1/2008 | Demmer .............. | H04L 29/06 709/203 |
| 7,376,716 B2 | 5/2008 | Dilley et al. | |
| 7,472,178 B2 | 12/2008 | Lisiecki et al. | |
| 7,512,708 B2* | 3/2009 | Read .............. | H04L 29/06027 709/245 |
| 7,533,164 B2 | 5/2009 | Volz et al. | |
| 7,660,296 B2 | 2/2010 | Fletcher et al. | |
| 7,694,127 B2* | 4/2010 | Adams ............. | H04L 29/06027 713/151 |
| 7,954,144 B1* | 5/2011 | Ebrahimi ............. | H04L 63/102 709/227 |
| 7,979,528 B2* | 7/2011 | Eisenberg .............. | H04L 29/06 709/224 |
| 8,214,635 B2* | 7/2012 | Wang ................. | H04L 63/0464 713/156 |
| 8,499,344 B2* | 7/2013 | Read ....................... | H04L 29/06 726/11 |
| 8,539,329 B2 | 9/2013 | Wilson | |
| 8,607,323 B2* | 12/2013 | Yuan .................... | G06Q 20/027 370/351 |
| 8,627,477 B2 | 1/2014 | Chen et al. | |
| 8,694,642 B2 | 4/2014 | Ulevitch et al. | |
| 9,154,512 B2* | 10/2015 | Qu .................... | H04L 29/12377 |
| 9,270,765 B2* | 2/2016 | Narayanaswamy ........................ | H04L 63/1425 |
| 10,038,631 B1 | 7/2018 | Ellis et al. | |
| 10,834,138 B2 | 11/2020 | Neystadt | |
| 2002/0059622 A1 | 5/2002 | Grove et al. | |
| 2004/0006615 A1* | 1/2004 | Jackson .............. | H04L 41/5009 709/223 |
| 2006/0098645 A1 | 5/2006 | Walkin | |
| 2008/0320116 A1 | 12/2008 | Briggs | |
| 2011/0173345 A1 | 7/2011 | Knox et al. | |
| 2011/0238767 A1 | 9/2011 | Murphy | |
| 2012/0255019 A1 | 10/2012 | Mcnamee et al. | |
| 2014/0164447 A1 | 6/2014 | Tarafdar et al. | |
| 2014/0310811 A1 | 10/2014 | Hentunen | |
| 2016/0036857 A1 | 2/2016 | Foxhoven et al. | |
| 2016/0072847 A1 | 3/2016 | Bremen et al. | |
| 2017/0223029 A1 | 8/2017 | Sharma et al. | |
| 2017/0279803 A1 | 9/2017 | Desai et al. | |
| 2020/0186500 A1 | 6/2020 | Neystadt et al. | |

OTHER PUBLICATIONS

U.S. Appl. No. 16/101,785, filed Aug. 13, 2018.
Blue Coat, Complete Web Visibility and Control, Blue Coat Reporter, Datasheet, 2013, 3 pages.
edgeblue.com, Blue Coat Reporter, downloaded on Jul. 16, 2018, 3 pages. http://www.edgeblue.com.
Example PAC File, Findproxy Forurl, downloaded on Nov. 9, 2018, 3 pages. http://findproxyforurl.com/example-pac-file.
Mcafee, Web Gateway: Understanding NTLM and Windows Domain Membership, downloaded on Jul. 16, 2018, 22 pages. https://community.mcafee.com/t5/Documents/Web-Gateway-Understanding-NTLM-and-Windows-Domain-Membership/ta-p/553819.
Tibbetts, Tracking the source of an internal infection—Cisco Umbrella, downloaded on Jul. 16, 2018, 4 pages. https://support.umbrella.com/hc/en-us/articles/115005910046-Tracking-the-source-of-an-internal-infection.
Wikipedia, Proxy auto-config, downloaded on Nov. 9, 2018, 4 pages. https://en.wikipedia.org/wiki/Proxy_auto-config.
Wikipedia, Radius, downloaded on Jul. 16, 2018, 18 pages. https://en.wikipedia.org/wiki/RADIUS.
Wikipedia, URL redirection, downloaded on Jul. 13, 2018, 12 pages. https://en.wikipedia.org/wiki/URL_redirection.
Wikipedia, X-Forwarded-For, downloaded on Jul. 16, 2018, 5 pages. https://en.wikipedia.org/wiki/X-Forwarded-For.
Zscaler, Inc., About Hosted PAC Files, downloaded on Nov. 19, 2018, 3 pages. https://help.zscaler.com/zia/about-hosted-pac-files.
Zscaler, Inc., Best Practices for Writing PAC Files, downloaded on Nov. 19, 2018, 4 pages. https://help.zscaler.com/zia/best-practices-writing-pac-files.
Zscaler, Inc., What is a PAC file, downloaded on Nov. 19, 2018, 3 pages. https://help.zscaler.com/zia/what-pac-file.
Zscaler, Inc., How do I distribute the PAC file URL to my users? Downloaded on Nov. 19, 2018, 5 pages. https://help.zscaler.com/zia/how-do-i-distribute-pac-file-url-my-users.
Zscaler, Inc., How do I use a custom PAC file to forward traffic to ZIA? Downloaded Nov. 19, 2018, 3 pages. Downloaded Nov. 19, 2018, 3 pages. https://help.zscaler.com/zia/how-do-i-use-custom-pac-file-forward-traffic-zia.
Zscaler, Inc., How do I use default PAC files to forward traffic to ZIA, downloaded on Nov. 19, 2018, 2 pages. https://help.zscaler.com/zia/how-do-i-use-default-pac-files-forward-traffic-zia.
Zscaler, Inc., Writing a PAC File, downloaded on Nov. 19, 2018, 5 pages. https://help.zscaler.com/zia/writing-pac-file.
Counterpart EU Patent Application 19191409.4, Response to European Search Report dated Aug. 19, 2020, 22 pages.
EU Patent Application 1919408.4, extended European Search Report dated Oct. 24, 2019, 10 pages.
U.S. Appl. No. 16/211,372, filed Dec. 6, 2018.
Office Action, for U.S. Appl. No. 16/211,372, dated May 27, 2020, 25 pages.
U.S. Appl. No. 17/087,816 (continuation).

* cited by examiner

| 0a | Indication of hostnames to proxy and/or indication of hostnames to bypass |
|---|---|
| 0b | Key distribution |
| 0c | Key distribution & proxy policy distribution |
| 1 | Register <Bouncer-IP> |
| 2 | DNS Request 'bouncer-pac.cloud.com' |
| 3 | DNS response with answer: <Bouncer-IP> |
| 4 | (Get PAC file)<br>HTTP Get http://bouncer-pac.cloud.com/proxy-auto-config |
| 5 | HTTP 302 Redirect to PAC Generator 112<br>http://cloud-pac.cloud.com/<private-client-ip> |
| 6 | (Get PAC file)<br>HTTP Get http://cloud-pac.cloud.com/<private-client-ip> |
| 7 | PAC file<br>SECURE <encrypted-private-client-ip>.cloudproxy.com |
| 8 | PAC Lookup to see if 'bypass' or 'use proxy'<br>DNS request for origin.com.PAC-lookup.cloud-proxy.com |
| 9 | HTTP Request via secure TLS connection to proxy 104<br>SNI field: <encrypted-private-client-ip>.cloud-proxy.com |
| 10 | Forward request to origin server 108 |

*FIG. 1B*

| | |
|---|---|
| 0a | Indication of hostnames to proxy and/or indication of hostnames to bypass |
| 0b | Key distribution |
| 0c | Key distribution & Policy distribution |
| ... | ... |
| 2 | DNS Request 'bouncer-pac.cloud.com' |
| 3 | DNS response with answer: <PAC generator 112 IP> |
| ... | ... |
| 6 | (Get PAC file)<br>HTTP Get http://cloud-pac.cloud.com/ |
| 7 | PAC file<br>SECURE <UID>.cloudproxy.com |
| 8 | PAC Lookup to see if 'bypass' or 'use proxy'<br>DNS request for origin.com.PAC-lookup.cloud-proxy.com |
| 9 | HTTP Request via secure TLS connection to proxy 104<br>SNI field: <UID>.cloud-proxy.com |
| 10 | Forward request to origin server 108 |

*FIG. 2B*

PROXY AUTO-CONFIGURATION FOR DIRECTING CLIENT TRAFFIC TO A CLOUD PROXY WITH CLOUD-BASED UNIQUE IDENTIFIER ASSIGNMENT

BACKGROUND

Technical Field

This application relates generally to network security and public and private computer networks.

Brief Description of the Related Art

It is known in the art to provide a proxy server, or 'proxy' for short, to analyze clients' attempts to access websites. A proxy that analyzes connections to websites is often referred to as a secure web gateway, or SWG. Typically, a proxy is configured to block access to sites that represent a security threat or otherwise violate an acceptable use policy for an organization. For example, an enterprise might deploy a proxy and force computers on the enterprise's private network (e.g., employees' computers) to traverse the proxy before egressing to the public Internet in order to block known malware sites or to perform inline payload analysis and block downloads that contain malware.

In the past, proxies often have been deployed as an appliance residing in an enterprise network. More recently, however, cloud hosted proxies have become popular. A cloud hosted proxy typically resides outside of the network which the proxy protects. A service provider operates the proxy as a service for the customer (e.g., the enterprise or other organization). The proxy typically sits on the public Internet; it may be anywhere in the world, although preferably the proxy servicing a given customer is located close (in network distance terms) to the customer Internet access point. In the cloud-proxy model, the customer arranges for its outbound traffic to leave the enterprise network and be directed to this cloud-based proxy. This can be accomplished by request routing mechanisms, such as via DNS. Hence, requests from clients in the enterprise network are directed to the proxy on the public Internet, or otherwise outside of that network. The proxy examines this traffic and applies policy define by the enterprise, thereby determining whether the traffic should be blocked.

A policy defines what the proxy should do for traffic associated with a given user or user device. Policies may include access policies, security policies, or others. Policies typically apply groups of users and user devices. So, the proxy needs to discover and identify the device to know which policy to apply, and to know what policy-dictated action to take (e.g., allow, inspect, block). And of course, the proxy needs to be able to report on (via audit logs) on the device that generated the traffic and the action that the proxy took. This is an important function, because in some cases an enterprise may need to take remedial action, such as removing malware from the device or contacting the user, or otherwise administratively handling the policy violation.

To discover and identify the offending user and/or device, the proxy can capture the client IP address of the device when it inspects the traffic. When the proxy is implemented as on-premises appliance, capturing the IP address of the client is fairly straightforward. However, when the proxy is provided as a cloud-based service, the situation is more complicated. Typically a network address translation (NAT) router/firewall separates a private network of the enterprise, where the client connects, from the proxy. A NAT hides the internal IP address of all client devices, so that traffic originating from multiple client devices behind the NAT appears to the proxy as if it is sees arriving from same IP address.

As a result, the actual client IP address is hidden from proxy and it cannot be captured, and the device cannot be identified when a client makes an HTTP request.

In addition, it is typical for clients inside the private network to be configured to use the proxy when attempting to fetch content (e.g., via HTTP request) under some domains, while bypassing the proxy server for other domains. The former is referred to as the 'proxy' case, while the latter is referred to as the 'direct' or 'bypass' case. As an example: it may be undesirable to send traffic for domains handling health or finance data via the proxy, for compliance reasons, it may be undesirable to send traffic for streaming media domains to the proxy, for performance reasons. Such domains might be candidates for bypassing of the proxy.

Proxy auto-configuration, or 'PAC', is how the bypass problem is solved today. A client inside a private network is configured to download and apply a PAC file. The PAC file contains instructions, typically in the form of Javascript statements, that tell the client which proxy, if any, to which the client should direct requests, based on the destination hostname and URL requested by the end user. There are many ways to write the PAC file: PAC file statements may designate a particular hostname specifically, or may specify classes of domain names, e.g., with wildcards such as *.example.com. A network administrator creates the PAC file and deploys it on the private network for clients to download and configure themselves. All major web browsers are compatible with this approach.

Once again, however, the situation becomes more complicated when using a cloud-hosted proxy. The conventional PAC file is limited in the number of domains it can handle, and it provides no way to indicate to the cloud proxy the internal (i.e., private network) client IP address assigned to the client within the private network, or to indicate any identifier for the client at all that would distinguish it from other clients in the private network. Furthermore, it is minimally scalable and customizable. A network administrator must create multiple version of proxy files, update them continually, and direct each client to the right one, which is inefficient and error-prone.

U.S. application Ser. No. 16/101,785, filed Aug. 13, 2018 and published as U.S. Pat. No. 10,834,138 (the contents of which are hereby incorporated by reference) describes an approach for identifying clients on a private network that contact a cloud-hosted proxy. The teachings of this document extend those teachings, particularly but without limitation into the realm of proxy auto configuration.

It is an object of this patent document to describe systems, methods and apparatus that enable the discovery and identification of a client device that uses a cloud-hosted proxy, and to enable the use of proxy auto-configuration with cloud-hosted proxy systems. It is an object of this patent document to provide methods and systems such that network administrators can easily, scalably, and in a highly configurable way control the domains for which clients contact the cloud-hosted proxy. Those skilled in the art will understand these and other improvements from the teachings hereof.

BRIEF SUMMARY

Among other things, this document describes systems, methods and devices for providing a proxy auto-configuration (PAC) function for clients in a private network, such as an enterprise network. The teachings hereof can be used with cloud hosted proxy service that enforces policy from outside of the private network (e.g., external to the enterprise or other organizational network). When applied to provide security checks for clients accessing web content, this proxy service is sometimes referred to as a secure web gateway or SWG service.

The teachings hereof can be used, without limitation, by a proxy system to attribute a client identifier to client requests received at the proxy, so that the correct policy can be selected and applied and client identification included in the audit logs. The teachings also can be used, without limitation, to dynamically control client behavior by dynamically instructing clients whether to contact an origin server directly or whether to use the proxy. Such control can be used to can enhance compliance and performance, among other things.

According to the teachings hereof, clients in the private network can be configured with a dynamically generated PAC file that contains and preferably encodes the client's private network identifier (such as private network IP address) in a proxy hostname, such that when the client contacts a proxy with a request and sends the proxy hostname, that proxy can extract and decode the client's identifier from the proxy hostname. Further, according to the teachings hereof, clients in the private network can be configured with a PAC file a dynamically generated PAC file that instructs clients to synchronously query a PAC lookup service to see whether content requests for a given hostname should be directed to a given proxy hostname or address, or should go directly to the desired origin website.

In one example, a method can include configuring the client to download a PAC file by contacting a bouncer component. The bouncer is deployed inside of the private network, behind the network address translation layer that sits between the private network and the cloud-hosted proxy. The bouncer redirects the client to a PAC generator service, which is preferably outside of the private network. The PAC generator service dynamically generates a PAC file for the client; this PAC file is advantageously customized based on the internal client identifier, which the bouncer obtained and embedded into the redirect to the PAC generator service and which the PAC generator service extracts from the redirect.

In a preferred embodiment, the generated PAC file can include the hostname of the cloud-hosted proxy with the client's identifier, such as internal IP address, encoded in the hostname. Since hostnames are sent in the clear over Internet, the client identifier can be encrypted, to hide from network observers the fact that the client is the source of the request. Also, rather than the PAC file specifying hostnames to be proxied or to bypass, the PAC file preferably includes code instructing the client to contact a PAC lookup service. The PAC lookup service can be implemented via DNS; that is, the client sends a DNS query to the PAC lookup service to determine whether to use the proxy.

When the client (and specifically, the client application such as the browser) needs to determine whether to send a content request to a proxy, the client can execute the PAC script, which sends a query to the PAC lookup service. It can receive a directive, such as "use proxy" or "bypass". This means that when the client needs to access a URL, it can send the hostname for that URL to the PAC lookup service, which consults a previously-received proxy-domain configuration from the enterprise or other private network owner to determine how to respond.

If the PAC lookup service directs the client to use the proxy, then the PAC script can instruct the client to contact the cloud-hosted proxy using the previously mentioned hostname of the cloud-hosted proxy. The cloud-hosted proxy server receives this request preferably in an encrypted form (e.g., using HTTP over TLS), with the proxy hostname being in the TLS SNI field. Because the proxy hostname contains the embedded private network client identifier (again, such as private network IP address), the cloud-hosted proxy server can extract, decode and thereby identify the specific client. Based on that client identifier, the proxy can select and apply the correct security policy, as well as authenticate/authorize the client and create audit log of the client activities with it against that client identifier.

This document also describes systems, methods and devices for providing a proxy auto-config (PAC) function for clients that may be associated with a private network, such as an enterprise network, but are not located in that network. In some cases, a client may move outside of the private network, and hence connected to a third party network (e.g., a guest network) in which the bouncer is not deployed. In this case, the PAC generator service can generate a unique identifier to the client and insert that identifier into the proxy hostname, rather than encoding the client identifier as described earlier. If and when the client connects to the proxy, this unique identifier allows the proxy to attribute the incoming message to the specific client; indeed all incoming connections/requests with the unique identifier can be attributed to that client on the basis of the unique identifier, even if arriving on other transport layer connections and/or from other networks (e.g., if the client moves to a new network). This feature enables the proxy to potentially skip prompting the client for authentication on every connection attempt.

The teachings hereof can be used to improve the security of a computer networks by discovering and identifying client devices that violate policy as enforced by a cloud-hosted proxy, and thereby improve the performance and operation of computers, computer networks, and network infrastructure.

The foregoing is a description of certain non-limiting aspects of the teachings hereof for purposes of illustration only; it is not a definition of the invention. The claims define the scope of protection that is sought, and are incorporated by reference into this brief summary. The claims are incorporated by reference into this section.

BRIEF DESCRIPTION OF THE DRAWINGS

The invention will be more fully understood from the following detailed description taken in conjunction with the accompanying drawings, in which:

FIGS. 1A and 1B are diagrams illustrating the architecture of a system according to one embodiment and to a flow of messages in that system according to one embodiment of the teachings hereof;

FIGS. 2A and 2B are diagrams illustrating the architecture of a system according to one embodiment and to a flow of messages in that system according to one embodiment of the teachings hereof;

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTTP/S), such as when TLS secured connections are established. The term "server" is used herein to refer to actual or virtualized hardware (a computer configured as a server, also referred to as an actual or virtualized "server machine") with server software running on such hardware (e.g., a web server). The term server thus includes an actual service and a virtual server. In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

System Overview

Figure 1A:
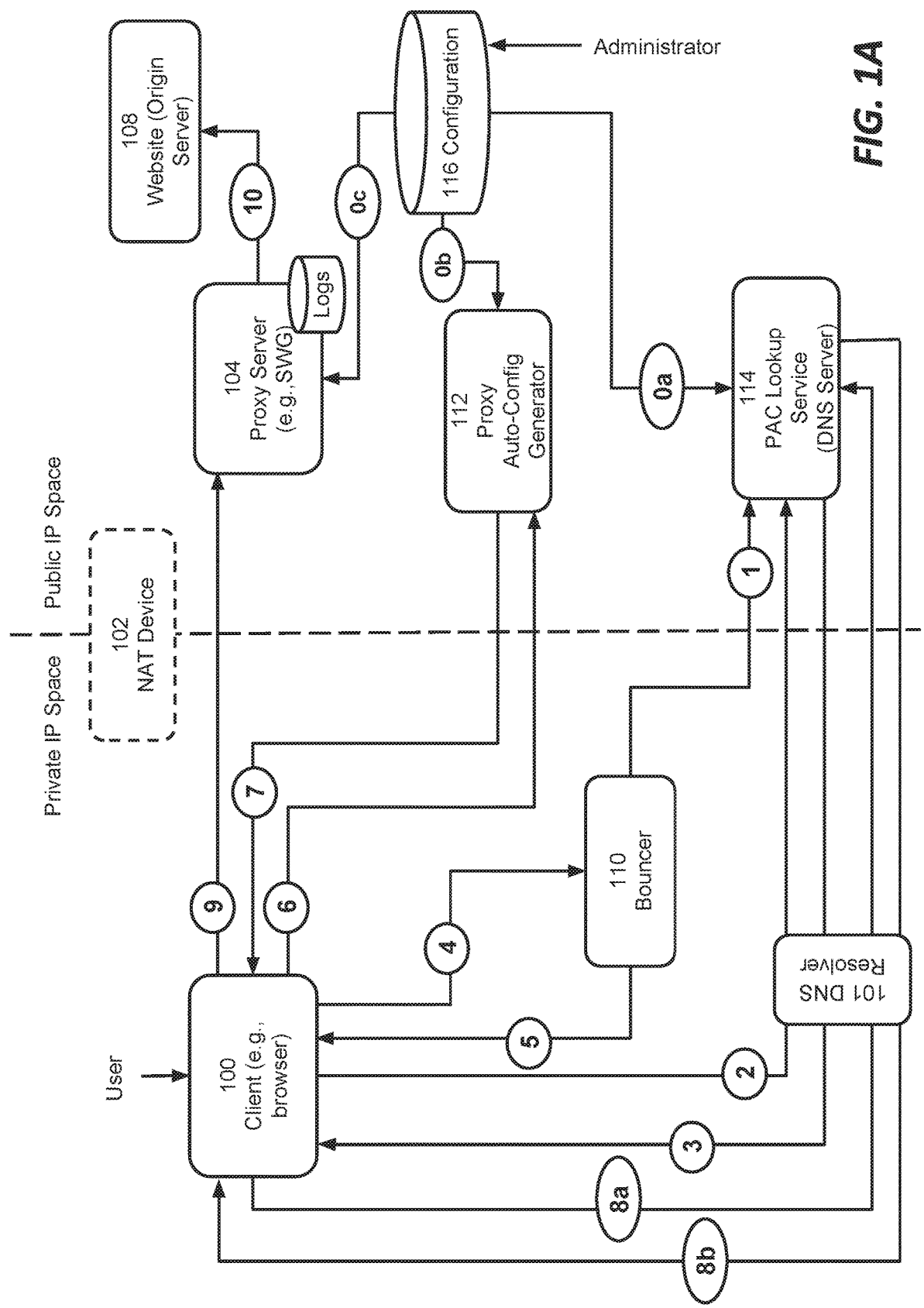

FIG. 1A is a block diagram of a system in accordance with one embodiment of the teachings hereof. Client 100 represents an end user client device running a client application, such as a browser or web-enabled app. The client 100 is connected to a private network, such as a enterprise LAN (private IP space in FIG. 1), which is separated from the public Internet (public IP space) by a NAT device 102. Other conventional network elements that may exist in the enterprise IP space, such as a firewall between the private/public IP spaces, or routers, switches, or modems, are not depicted solely for convenience of illustration.

On the public IP side, a service provider deploys and operates a proxy server 104, referred to herein for short as a 'proxy', which preferably inspects and applies security policies to client traffic. In this embodiment, assume that the proxy operates to inspect web traffic; aproxy of this type is sometimes referred to as a secure web gateway (SWG). The teachings hereof are not limited to SWGs, however.

When providing a SWG type service, the service provider may operate the proxy 104 to inspect traffic that is carried in HTTP messages, and particularly traffic that is exiting from or entering to the private IP space as part of an HTTP message exchange in which the client 100 is requesting certain content from an Internet website. A website on the public IP side is shown as 108. The website's content is hosted on a server, which is typically referred to as an origin server.

As noted, the proxy 104 inspects traffic and applies policy on behalf of the enterprise (or other organization) managing the private IP space. The proxy 104 applies a policy of the enterprise to inspect and block client access to websites that are a security threat, malicious, known to be associated with malware, containing objectionable content, or otherwise contrary to a configured acceptable use policy.

The service provider may provide services to many customers, and components 104, 112, and 114, and 116 may operate on a multi-tenant basis. Though the services are made available for many organizations, each customer of the service provider preferably can configure its own policy to be applied to its own corresponding traffic.

The bouncer 110 is a component deployed in the private IP space. The bouncer 110 is typically implemented as hardware appliance, software, and/or software running in a virtual machine. It is typically provided by the service provider to the enterprise or other organization administering the private network.

The Proxy Auto Config (PAC) generator 112, also referred to as a PAC generator service 112, is a service provider component that may be implemented as an HTTP server providing a PAC file download to clients.

The PAC lookup service 114 is a service provider component that may be implemented using DNS. That is, the PAC lookup service 114 may be provided by a DNS server that is authoritative for certain domains to which the client 100 (and specifically that PAC file script) can direct DNS queries to execute a PAC lookup.

The configurator 116 represents a backend database and management computer containing the configuration of hostnames to proxy or bypass, encryption keys for use in encrypting the client's private IP address or other identifier, and other data, and which may be used in other functions. An administrator stores this information in the configurator 116 prior to system operation. An administrator for the private network administrator may access the configurator 116 and store the information via a user interface (e.g., web based portal application).

The audit log component, shown as part of the proxy 104 by the "Logs" element, is a component that collect, aggregate, and process log informations from the proxy server and makes it available asynchronously to an administrator, along with analytical information about policy violations, and/or provide another system with such information for automated action/mitigation. This and other functions will be described in more detail below.

System Operation

FIGS. 1A and 1B illustrate system operation, at least in one embodiment, with circled steps (0*a*) to (10) labeled in the diagram. FIG. 1A shows message flow between the previously described system components. FIG. 1B provides a legend that identifies examples of the type and content of messages that can be sent and received in the indicated steps, the messages in FIG. 1B are teachings examples, and not intended to be exhaustive. Moreover, the steps labeled in FIGS. 1A and 1B are intended to be examples or pertinent operations and are not exhaustive; the presence of the steps shown in FIGS. 1A-1B should not be interpreted as meaning that additional steps do not occur. Some operations are internal to the components and will be described in more detail below.

To configure the system, the administrator configures the proxy bypass list via a user interface to the configuration database of the configurator 116. The list can be specified in any suitable manner, such as an explicit list of specific hostnames, a list of wildcarded hostnames such as second-level and top level domain names with wildcards (e.g., proxy all traffic under *.example.com), with regular expressions, and the like. The list might represent actual domains, or use some higher-level categorization or indication, which can be translated to a flat list of hostnames.

At step (0a), the list of bypass hostnames is sent from the configurator 116 to the PAC Lookup service 114. At step (0b) and (0c).

If client identifier should be encrypted, the configurator 116 distributes key material for an encryption/decryption system 1 to the PAC generator 112 and to the proxy server 104, respectively.

The administrator of the private network configures the bouncer 110 by assigning it a private network IP address. The administrator also configures the hostname for Proxy-Auto-Config on the client computers in the organization. This can be achieved using known methods, such as via Desktop/Mobile Management software, a DHCP server or WPAD protocol. The hostname points to a hostname for the bouncer, e.g., <bouncer-pac.cloud.com>, for which the PAC lookup service 114 is authoritative.

At step (1), the bouncer 110 registers itself with the PAC lookup service 114 by making an outbound call through the firewall of the private network and sending the PAC lookup service 114 its assigned network IP address. The bouncer 110 is on the same network as clients 100.

The PAC discovery process starts with the client 100 sending a DNS query to resolve the PAC hostname and then obtain a PAC file. As mentioned above, this hostname has been configured to point to the cloud service, e.g., <bouncer-pac.cloud.com>, so the client 100 sends a DNS query to the PAC lookup service 114 at step (2), and the PAC lookup service 114 responds at step (3) with the private network IP address of the bouncer 110, which it obtained via bouncer registration at step (1). It should be noted that the client 100 will typically send the DNS query to a local DNS resolver, which then recursively resolves the DNS query for the client. In this case the local DNS resolver will eventually querying the lookup service 114 because it is authoritative for the name, i.e., using a conventional DNS lookup process as is known to those skilled in the art. This is what the presence of DNS resolver 101 included in FIG. 1A indicates for (2), (3), (8a-b). Conventionally, a client does not typically directly query PAC lookup service 114, although this is possible in some implementations.

Upon receiving the IP address of the bouncer 110, the client 100 sends a request to the bouncer 110 to download the PAC file (step (4) in FIG. 1A), e.g., via an HTTP(s) GET request.

The bouncer 110 receives this request and responds, at step (5), with a redirect (e.g., HTTP(s) response code 302) to a URL it generates dynamically. The bouncer 110 acquires client identifier, such as IP address. There are a variety of kinds of client identifiers and methods for capturing client identifiers. For example, if the client identifier is the private network IP address of the client 100, the bouncer 110 can obtain it by extracting it from the source IP address field of the packets received by the client 100 carrying the request in step (5) or other method. As another examples, the identifier could be an IPSec certificate or data therein, and so the bouncer 110 could extract the client identifier from that certificate. As yet another example, the client identifier could be a name or other identifier obtained by the bouncer 110 lookup the client in the organizational CMDB (Configuration Management Database), LDAP server, or other database to get an assigned identifier. The CMDB or LDAP database may provide a user or device attribute in response. Many kinds of client identifier can be used in the teachings hereof, but preferably the client identifier uniquely identifies the client amongst other clients in the private network, or uniquely identifies a particular class or category of clients within the private network to which the client 100 belongs.

In FIGS. 1A and 1B, and in the examples that follow, the client's private network IP address (indicated as <Private-Client-IP>) is used as a specific example of the client identifier; however, this is merely by way of illustration for teaching purposes and should not be interpreted as limiting the teachings hereof.

The bouncer 110 generates the redirect URL to contain a hostname pointing to the PAC generator 112 and also to contain the client identifier <Private-Client-IP> in a portion of the URL (e.g., in a URL parameter or a pathname). The URL is preferably specified with HTTP/S, so the client should connect in a secure fashion (e.g., using TLS) to the PAC generator 112. This is done since the private network IP address or other client identifier is likely considered sensitive information, because for example it can be used to trace or impersonate the user.

In accord with conventional HTTP redirect behavior, the client 100 follows the redirect and sends a request to the PAC generator 112 to download the PAC file. This means that the client sends a request, e.g., an HTTP GET request, with the URL containing the client's identifier embedded therein. This is step (6) in FIG. 1A.

The PAC generator 112 receives the client's 100 request with the redirect URL and in response the PAC generator 112 generates a PAC file. The PAC generator 112 can generate a unique PAC file for each client, based on the client's identifier, which it extracts from the redirect URL, and a configuration provided by the administrator. For example, some PAC files for some clients may contain different logic and different domains for proxy bypass than others.

Preferably, the PAC file is unique for the client 100 at least because the PAC generator 112 generates a PAC file that contains a proxy hostname with the requesting client's 100 identifier embedded therein. This can be accomplished by encrypting the client identifier <Private-Client-IP> into <Encrypted-Private-IP>, using an authenticated encryption schemes, including timestamp to protect from replay attacks, encryption scheme specific parameters and generating a proxy hostname with the encrypted client identifier inserted into a subdomain field of a hostname that resolves to the proxy server 104. An example is: <Encrypted-Private-IP>.cloud-proxy.com. As those skilled in the art will understand, the client identifier could be embedded in virtually any aspect of a hostname. The encrypted field is encoded (e.g. with base 64 encoding) to fit the allowed format of DNS label, which is commonly limited alpha-numeric and '_' characters and 63 bytes of length.

The PAC generator 112 encrypts the client's identifier using the encryption key distributed in step (0b) that is associated with this client identifier, group of clients and/or enterprise. The PAC generator 112 inserts the custom proxy hostname into the PAC file, where it uses a statement to the indicate to the client to connect securely to the hostname, e.g., over TLS, and accordingly send <Encrypted-Private-IP>.cloud-proxy.com in TLS SNI field to the client 100 to proxy 104 connection. The encryption of the client identifier is preferred because it is considered sensitive information and even in a TLS secured connection the SNI header will be sent over Internet in an unencrypted form. There are a few different, but common ways to provide the appropriate statement to indicate that a secure connection should be used. One example is a SECURE statement of the form "SECURE <proxy-address>:<proxy-port>". So in the above example, the statement could be: "SECURE <Encrypted-Private-IP>.cloud-proxy.com:8443". Another example is an HTTPS statement of the form "HTTPS <proxy-address>:<proxy-port>".

The generated PAC file can also include a script with instructions (e.g., in Javascript for a browser, or whatever language the relevant client application can interpret). The instructions tell the client to issue a remote call to a PAC lookup hostname in order to determine whether to proxy or to bypass a particular domain name to which the client desires to connect. Preferably the remote call is a DNS lookup to the PAC lookup service 114, which is authoritative for the PAC lookup hostname.

At step (7), the PAC generator 112 serves the generated PAC file with the above attributes to the client 100, in response to its request at step (6).

Not all client browsers will support client 100 to proxy 104 connections over TLS; some will support only an unencrypted HTTP connection for example. The PAC generator 112 can detect browser type, for example by using User-Agent: header and handle such browsers in one of several ways. For example, at step (7) the PAC generator 112 can (i) reject connections from such browsers or (ii) return "PROXY <proxy.cloud-proxy.com>" so that the proxy hostname is without the client identifier embedded therein.

Assuming the client 100 supports encrypted client to proxy connections, the client 100 receives the PAC file at step (7), with <Client-Private-IP> encrypted and embedded in the PROXY hostname.

Following the aforementioned steps, assume an end-user of the client 100 attempts to access a website 108 at hostname <origin.com> or otherwise accesses a page or resource that refers to the <origin.com> hostname in the background. The client 100 will need to fetch content (e.g., a web page or other content) from the origin web site 108. The client 100 executes the script in the PAC file, passing the origin hostname as a parameter. The script in the PAC file instructs the client 100 to perform a PAC bypass lookup on the origin.com hostname, in the form of a DNS query, appending a special suffix that for the PAC lookup service 114 is authoritative (e.g. origin.com.PAC-lookup.cloud-proxy.com) where the lookup service 114 is authoritative for *.PAC-lookup.cloud-proxy.com and the 'PAC-lookup.cloud-proxy.com' is a special DNS suffix that assures that DNS query arrives to the lookup service 114 and also can be used to signify to it that this a PAC lookup request.

In accord with conventional DNS resolution processes, the DNS query may first be directed to a local DNS resolver, which may issue a recursive DNS request reaching the PAC lookup service 114. This is indicated by step (8a).

The PAC lookup service 114 checks internally whether the traffic to origin.com should be sent to the proxy server 104 or not, by consulting the configuration received in step (0a) for the enterprise. At (8b), the service 114 responds with a directive indicating whether or not the client 100 should use the proxy 104 for requests to the origin.com hostname.

The directive can be encoded into a DNS answer in a variety of ways. In one embodiment, the service 114 can respond with a DNS answer that encodes the directive into a first particular IP address (such as 1.1.1.1) if bypass should be done and different IP address (such as 1.1.1.0) if not. This directive is transmitted at step (8b) in FIG. 1B. The PAC lookup service 114 can provide additional directives, by returning other special IP addresses, such as DROP the request, route to a different Proxy server, etc.

Back at the client 100, the script logic in the PAC file evaluates the received directive and accordingly instructs the browser to go directly to the origin 108 ("return DIRECT;"), use the proxy 104, or another action. In the proxy case, the client 100 is instructed to contact the proxy 104 at the proxy hostname with the encoded client identifier received in step (7) (for example, "return SECURE <Encrypted-Private-IP>.cloud-proxy.com:8443").

If the client 100 was instructed to use the proxy server 104, the client 100 looks up the proxy 104 hostname (e.g., using DNS services from PAC lookup 114 in a conventional DNS lookup operation). The client 100 receives an IP address for the proxy 104 in response and opens a TLS secure connection to the proxy 104 at step (9). The client 100 issues the content request (e.g., an HTTP Get request for the end-user's desired URL) to the proxy 104. The proxy 104 receives this message, extracting the SNI field from the TLS packets. Using the example above, the hostname extracted from the SNI field would be: <Encrypted-Private-IP>.cloud-proxy.com The proxy 104 decodes and optionally decrypts the encrypted client identifier using the decryption key distributed during configuration in step (0c). Proxy 104 authenticates the encryption and verifies that timestamp has not expired, to protect from replay attacks. Hence, the proxy server 104 is able to discover the client identifier (e.g., private network IP address) of the client 100. This identifier, as explained earlier, will differ from the source IP address in the packets received by the proxy server 104 from the client 100 at step (9), due to the NAT device 102.

The proxy server 104 can select and apply a policy for inspecting the content request received at step (9), based on the client identifier of the client 100. Furthermore, the proxy 104 can use the client identifier for logging, connection authentication and/or authorization, session management and other purposes.

If the proxy 104 successfully authenticates and authorizes the client 100 for the content being requested, then in accord with the configured policy and conventional proxy operation, the proxy 104 can generate a forward request (step 10) to the origin server 108 for the desired content. In general the proxy 104 can proxy the transaction in a conventional manner as modified by the selected policy. This is not meant to imply that the security check is only done once, upon receiving the initial content request at (9). The proxy 104 security policy applicable to this client 100 may direct the proxy 104 to inspect and/or block responses from the origin server 108.

In some embodiments, authentication process can be skipped if the proxy 104 can identify the client 100 as a returning client, which can be done by recognizing the client identifier in the TLS SNI field. When the client 100 connects to the proxy 104 on subsequent connections, the proxy 104 can extract and use the client identifier to determine that the connection belongs to the same client 100 as previously authenticated in the authentication record. Put another way, the TLS SNI value came from the PAC file uniquely generated for a particular client 100. Hence, the proxy 104 can determine that all connections with the same SNI value belong to the same client 100. When the client reconnects, it does not have to authenticate again.

The audit logs created by the proxy 104 component allow an enterprise or other private network administrator to inquire for list of HTTP requests received by the proxy 104 and show a list of [client identifiers], [client's desired hostnames] that were compliant or violated the policy, so that administrator can take a technical or organizational action against them. In some cases, the audit logs are captured in a data feed which can be sent to an automated system (e.g. SIEM) that takes some remedial action automatically. The action could be, for example, disabling the client 100 access to the private network (quarantine), enforcing controls to block the client 100 from reaching beyond the private IP space (i.e., blocking from command and control servers in the public IP space), and/or pro-active alerting of the administrator, or the like.

Roaming Client Embodiment

Figure 2A:
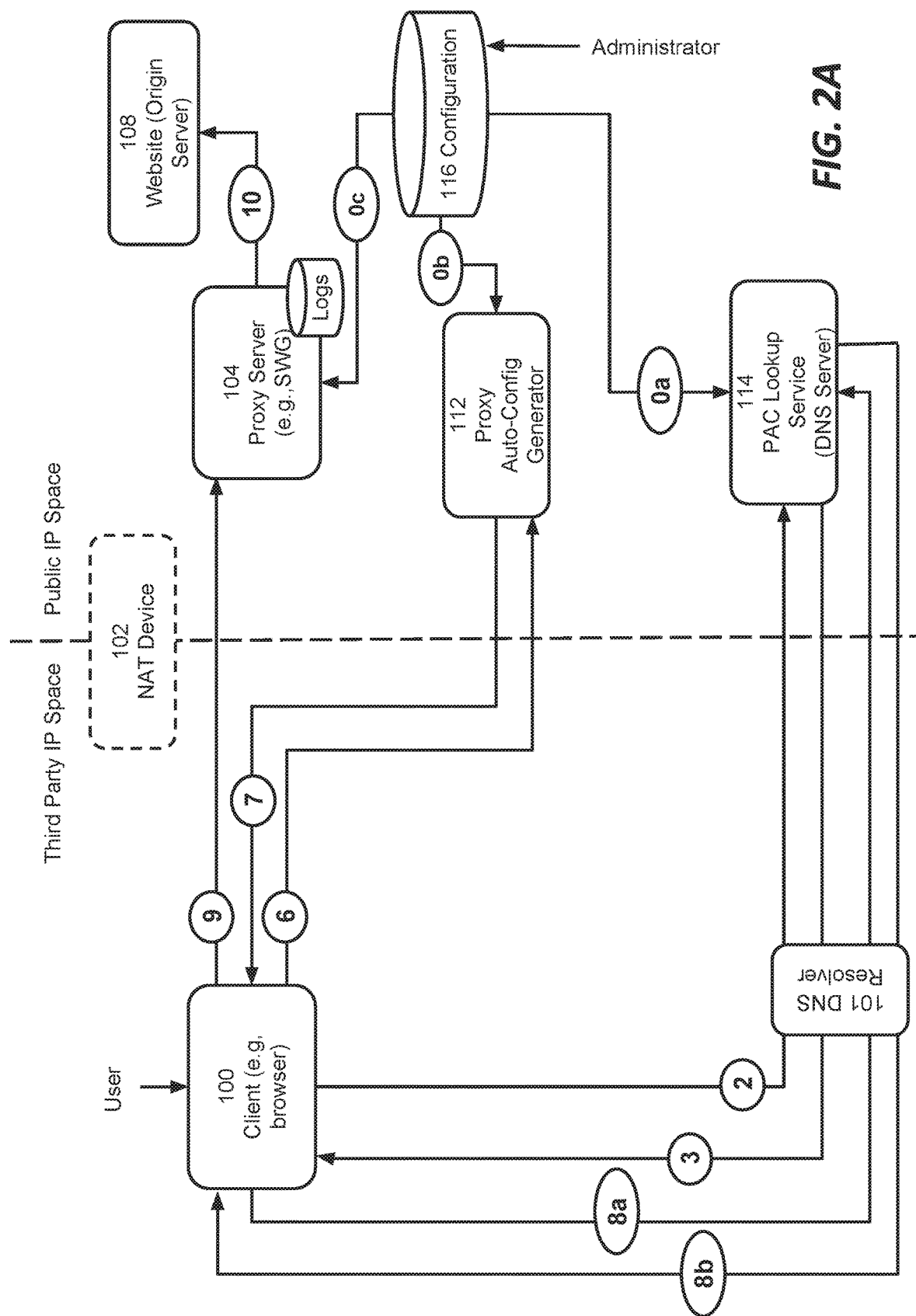

Sometimes, the client 100 may go outside of the private network, to another network that has no bouncer deployed. For example, an enterprise employee with a laptop client 100 might travel for work or might work remotely from the office. The client 100 may have a network connection provided by a hotel, airport, coffee shop, another entity's guest network, or similar network. In these situations, the bouncer component 110 is not available to the client 100. FIGS. 2A and 2B illustrate an alternate embodiment for handling these kind of situations. FIG. 2A shows a system, where like-numbered components correspond to the components as described with respect to FIG. 1A. Instead of being connected to a private network, the client 100 is connected to a "third party network", which could be a network offered by any third party, such as the aforementioned hotel, airport, coffee shop, another entity's guest network, or the like. FIG. 2B shows examples of message flow for FIG. 2A.

Steps (0a to 0c) and step (2) in FIG. 2A are the same as described with respect in FIG. 1A. Upon receiving the client's 100 DNS request to resolve the bouncer hostname, at step (2), the PAC lookup service 114 determines that there is no bouncer 110 associated with the network (e.g., the "third party network") where the client's request came from. This can be determined by examining the public egress IP address of the DNS resolver that the client 100 is using and/or end user client subnet information in the DNS query. As a result of this determination, the PAC lookup service 114 responds with the IP address of the PAC generator 112 at step (3). Accordingly, the client 100 does not contact a bouncer 110, and steps (4) and (5) shown in FIG. 1A do not occur. Rather, the client 100 sends a request for the PAC file directly to the PAC generator 112 at step (6). The PAC lookup service 112 could respond with a special IP address that is for the PAC generator 112, but only used when there is no bouncer 110 available.

The PAC generator 112 receives this request, but unlike the embodiment described with respect to FIG. 1A, the request does not include a real client identifier for the client 100 like the one obtained by the bouncer 110 in FIG. 1A embodiment. The PAC generator 112 can check to see if there is a redirect URL with a real client identifier; alternatively, the PAC generator 112 can recognize that the IP address at which it received the request (i.e., the destinate IP address handed in the request packet) is the special address handed out by the PAC lookup service 114 when there is no bouncer, so there will be no real client identifier. As a result of the lack of real client identifier, the PAC generator 112 itself generates a random unique identifier (such as UUID4), to use as client identifier for the client 100, to distinguish it from other clients. This generated unique identifier is referred to as a "UID" for short, in the following text, regardless of the method used to create or assign it.

The PAC generator 112 then optionally uses authenticated encryption scheme, timestamp to protect from replay attack, and other encryption scheme specific parameters and to encrypts this UID and encode it, into the proxy 104's hostname in the PAC file and sends it to the client 100 at step (7). Hence the PAC file is the same as described before, except that the proxy hostname is, for example: "SECURE <Encrypted-UID>.cloud-proxy.com" where the <Encrypted-UID> is the encrypted UID. Furthermore, the proxy 104 may support a mixture of clients coming from networks with bouncer and without bouncers, using different types of client identifiers. Therefore, in these cases the proxy hostname may include an encoded parameter indicating whether the UID or Private-Network-IP or other kind of client identifier was used.

Steps (8a-b) occurs as described before, with the client 100 executing a PAC lookup as directed by the script in the PAC file. At step (9) the client 100 sends a content request to the proxy 104, with the proxy hostname (e.g., <Encrypted-UID>.cloud-proxy.com) in the TLS SNI field. The proxy 104 extracts the UID, authenticates the encryption and verifies that it has not expired to protect against replay attacks. The proxy 104 determines that the proxy hostname contains a UID rather than a private network IP address or other identifier for the client 100.

Upon making this determination, the proxy 104 authenticates the client 100. A series of authentication challenges can be provided, such as prompting the user to provide a username and password, requesting two factor authentication, requesting a credential such as a certificate installed on the client, or any other method known in the art. Assuming the client 100 passes these checks, the client 100 is authenticated. The proxy 104 then stores the fact that the UID corresponds to an authenticated client 100 in an internal authentication record. Based on the knowledge of who the client is, the proxy 104 can apply an appropriate policy, that is, based on the user identifier established through the authentication process (e.g., based on the username, the credential or other identifier provided during authentication) rather than the identifier obtained by the bouncer 110, as was the case in the FIG. 1A embodiment. The proxy 104 can also issued a forward request in step (10), and otherwise log the transaction and/or monitor a message exchange in the same manner as already described for FIG. 1A.

The authentication process can be skipped if the proxy 104 can identify the client 100 as a returning client, which can be done through use of the UID in the TLS SNI field. When the client 100 connects to the proxy 104 on subsequent connections, the proxy 104 can extract and use the UID to determine that the connection belongs to the same client 100 as previously authenticated in the authentication record. Put another way, the TLS SNI value came from the PAC file uniquely generated for a particular client 100. Hence, the proxy 104 can determine that all connections with the same SNI value belong to the same client 100. Even if the client 100 connects through a different network (e.g., as the client 100 moves from airport network to hotel network), it does not have to authenticate again.

Use in Content Delivery Networks

The teachings hereof may be implemented in a system in which the proxy 104 is a proxy server deployed by a CDN. Hence, a description of a conventional CDN is now provided. The functions of the proxy 104 that are described above may be implemented by the CDN server 302 described below and shown in FIG. 3.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 3:
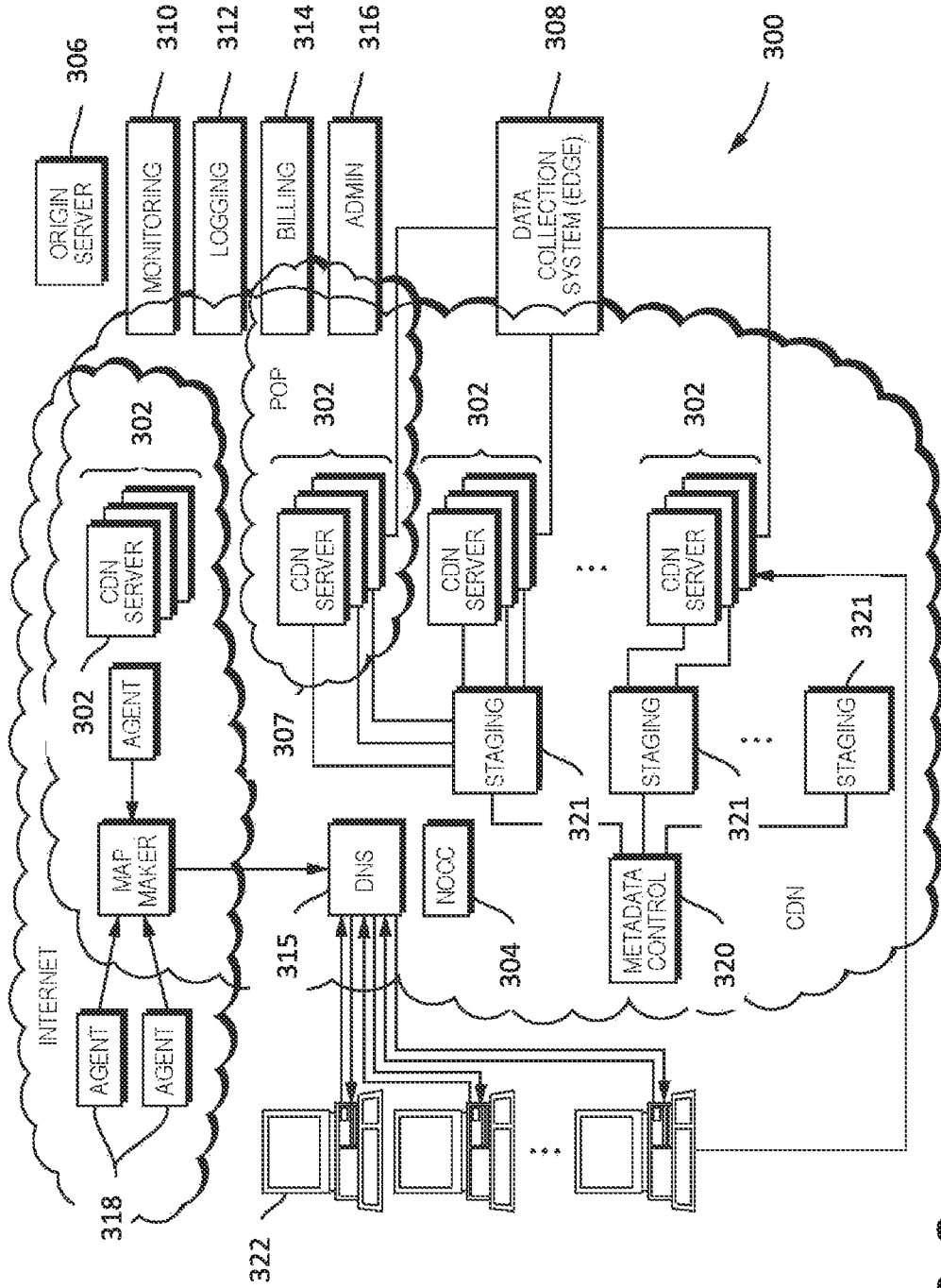
FIG. 3 is a high-level diagram of an embodiment of a content delivery network (CDN) in which the teachings hereof may be implemented; and, FIG. 4 is a block diagram illustrating hardware in a computer system that may be used to implement the teachings hereof.

In a known system such as that shown in FIG. 3, a distributed computer system 300 is configured as a content delivery network (CDN) and is assumed to have a set of machines 302 distributed around the Internet. The machines 302 are servers and can be the network cache mentioned in this document. Typically, most of the machines are configured as servers and located near the edge of the Internet, i.e., at or adjacent end user access networks. A network operations command center (NOCC) 304 may be used to administer and manage operations of the various machines in the system. Third party sites affiliated with content providers, such as web site 306, offload delivery of content (e.g., HTML or other markup language files, embedded page objects, streaming media, software downloads, and the like) to the distributed computer system 300 and, in particular, to the servers 302 (which are sometimes referred to as content servers, or sometimes as "edge" servers in light of the possibility that they are near an "edge" of the Internet). Such servers may be grouped together into a point of presence (POP) 307.

Typically, content providers offload their content delivery by aliasing (e.g., by a DNS CNAME) given content provider domains or sub-domains to domains that are managed by the service provider's authoritative domain name service. End user client machines 322 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 3, the distributed computer system may also include other infrastructure, such as a distributed data collection system 308 that collects usage and other data from the CDN servers, aggregates that data across a region or set of regions, and passes that data to other back-end systems 310, 312, 314 and 316 to facilitate monitoring, logging, alerts, billing, management and other operational and administrative functions. Distributed network agents 318 monitor the network as well as the server loads and provide network, traffic and load data to a DNS query handling mechanism 315, which is authoritative for content domains being managed by the CDN. A distributed data transport mechanism 320 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy typically includes a manager process for managing a cache and delivery of content from the machine. For streaming media, the machine typically includes one or more media servers, as required by the supported media formats.

A given CDN server 302 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer CA certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
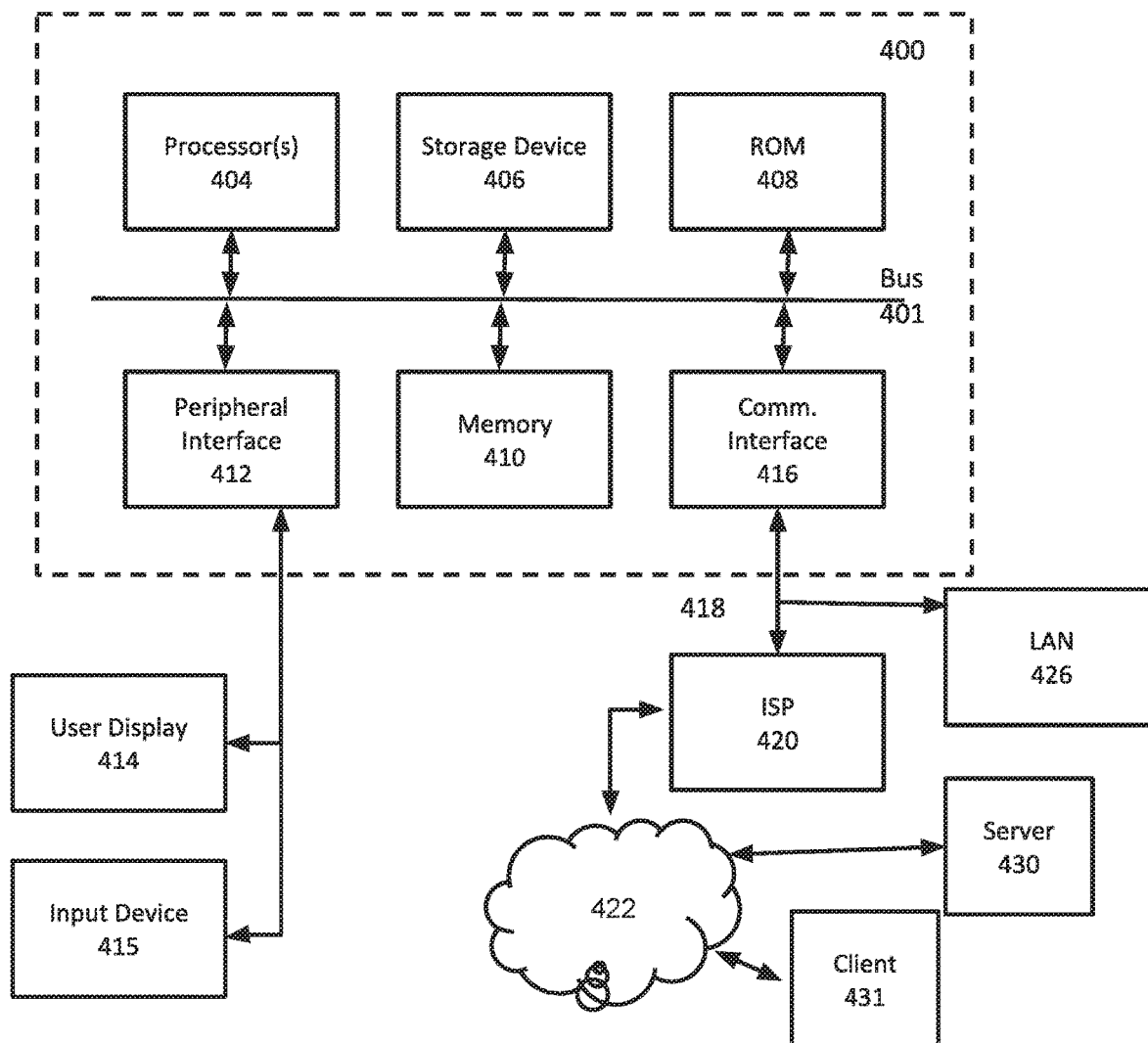

FIG. 4 is a block diagram that illustrates hardware in a computer system 400 upon which such software may run in order to implement embodiments of the invention. The computer system 400 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 400 includes a microprocessor 404 coupled to bus 401. In some systems, multiple processor and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 404. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 communicatively couples computer system 400 to a user display 414 that displays the output of software executing on the computer system, and an input device 415 (e.g., a keyboard, mouse, trackpad, touchscreen) that communicates user input and instructions to the computer system 400. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer) between the system bus 401 and an external communication link. The communication interface 416 provides a network link 418. The communication interface 416 may represent a Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 418 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for proxy auto-configuration (PAC) of a particular client associated with an organization, the particular client connected to a third party network, the method comprising:
providing a PAC generation service deployed and operated by a service provider for the organization, and a proxy server;
with the PAC generation service:
receiving a request from a particular client for a PAC file;
generating a unique identifier for the particular client;
generating the PAC file to include (i) a proxy hostname that resolves to the proxy server and (ii) the unique identifier for the particular client; and,
serving the generated PAC file to the particular client, in response to the request.

2. The method of claim 1, further comprising:
prior to generating the unique identifier for the particular client, checking the request for the PAC file to determine whether the request includes an identifier for the particular client that uniquely identifies the particular client amongst other clients in a private network for the organization that is distinct from the third party network; and,
upon a determination that the request does not include the identifier for the particular client, generating the unique identifier for the particular client.

3. The method of claim 1, wherein checking the request comprises any of: (i) checking a URL in the request and (ii) checking a destination IP address at which the PAC generation service received the request.

4. The method of claim 1, wherein the proxy hostname in the PAC file comprises a first portion corresponding to the unique identifier for the particular client and a second portion that is associated with the proxy server.

5. The method of claim 4, further comprising:
at the proxy server:
as a result of the PAC generation service serving the generated PAC file to the particular client, receiving from the particular client a content request that includes the proxy hostname;
extracting the unique identifier of the particular client from the first portion of the proxy hostname; and,
performing an action based on the unique identifier, said action comprising one or more of:
(i) selecting a security policy to apply to the content request,
(ii) authenticating the particular client,
(iii) authorizing the particular client for access to content identified in the content request, and
(iv) logging the particular client's access to content identified in the content request.

6. The method of claim 5, wherein extracting the unique identifier comprises any of:
decoding and decrypting the unique identifier.

7. The method of claim 4, further comprising:
at the proxy server:
as a result of the PAC generation service serving the generated PAC file to the particular client, receiving from the particular client a content request that includes the proxy hostname;
extracting the unique identifier of the particular client from the first portion of the proxy hostname;
determining whether the unique identifier is associated with a record of previous authentication;
upon a determination that the unique identifier is not associated with the record, performing an authentication process, establishing a record of authentication for the particular client, and proxying communications of the particular client in accord with a policy configured by the organization; and,
upon a determination that the unique identifier is associated with a record of previous authentication, skipping the authentication process, associating the content request with the particular client, which was previously authenticated, and proxying communications of the particular client in accord with a policy configured by the organization.

8. The method of claim 4, further comprising:
at the proxy server:
as a result of the PAC generation service serving the generated PAC file to the particular client, receiving from the particular client a content request that includes the proxy hostname;
extracting the unique identifier of the particular client from the first portion of the proxy hostname; and
associating the particular client with any of an authentication record and a policy, based on the unique identifier.

9. The method of claim 8, wherein the proxy hostname is included in a TLS SNI field of the content request.

10. The method of claim 1, wherein the organization comprises an enterprise.

11. The method of claim 1, wherein the proxy server comprises a secure web gateway.

12. An apparatus for providing proxy auto-configuration (PAC) of a particular client associated with an organization, the particular client connected to a third party network, the apparatus comprising:
a computer comprising circuitry forming a processor and memory holding instructions for execution on the processor to provide a PAC generation service, the computer deployed and operated by a service provider, the PAC generation service comprising:

receiving a request from a particular client for a PAC file;

generating a unique identifier for the particular client;

generating the PAC file to include (i) a proxy hostname that resolves to a proxy server and (ii) the unique identifier for the particular client; and, serving the generated PAC file to the particular client, in response to the request.

13. The apparatus of claim 12, the PAC generation service further comprising:

prior to generating the unique identifier for the particular client, checking the request for the PAC file to determine whether the request includes an identifier for the particular client that uniquely identifies the particular client amongst other clients in a private network for the organization that is distinct from the third party network; and upon a determination that the request does not include the identifier for the particular client, generating the unique identifier for the particular client.

14. The apparatus of claim 12, wherein checking the request comprises any of: (i) checking a URL in the request and (ii) checking a destination IP address at which the PAC generation service received the request.

15. The apparatus of claim 12, wherein the proxy hostname in the PAC file comprises a first portion corresponding to the unique identifier for the particular client and a second portion that is associated with the proxy server.

16. A system for providing proxy auto-configuration (PAC) of a particular client associated with an organization, the particular client connected to a third party network, the system comprising:

a first computer comprising circuitry forming a processor and memory holding instructions for execution on the processor to provide a PAC generation service, the first computer deployed and operated by a service provider, the PAC generation service comprising:

receiving a request from a particular client for a PAC file;

generating a unique identifier for the particular client;

generating the PAC file to include (i) a proxy hostname that resolves to a proxy server and (ii) the unique identifier for the particular client;

wherein the proxy hostname in the PAC file comprises a first portion corresponding to the unique identifier for the particular client and a second portion that is associated with the proxy server and, serving the generated PAC file to the particular client; and a second computer comprising circuitry forming a processor and memory holding instructions for execution on the processor to provide and operate the second computer to:

as a result of the PAC generation service serving the generated PAC file to the particular client, receive from the particular client a content request that includes the proxy hostname;

extract the unique identifier of the particular client from the first portion of the proxy hostname; and, perform an action based on the unique identifier, said action comprising one or more of:

(i) selecting a security policy to apply to the content request, (ii) authenticating the particular client, (iii) authorizing the particular client for access to content identified in the content request, and (iv) logging the particular client's access to content identified in the content request.

17. The system of claim 16, wherein extracting the unique identifier comprises any of: decoding and decrypting the unique identifier.

18. The system of claim 16, the second computer comprising circuitry forming a processor and memory holding instructions for execution on the processor to provide and operate the second computer to:

determine whether the unique identifier is associated with a record of previous authentication;

upon a determination that the unique identifier is not associated with the record, perform an authentication process, establishing a record of authentication for the particular client, and proxying communications of the particular client in accord with a policy configured by the organization; and, upon a determination that the unique identifier is associated with a record of previous authentication, skip the authentication process, associating the content request with the particular client, which was previously authenticated, and proxying communications of the particular client in accord with a policy configured by the organization.

19. The system of claim 16, the second computer comprising circuitry forming a processor and memory holding instructions for execution on the processor to provide and operate the second computer to:

associate the particular client with any of an authentication record and a policy, based on the unique identifier.

20. The system of claim 16, wherein the proxy hostname is included in a TLS SNI field of the content request.

21. The system of claim 16, wherein the organization comprises an enterprise.

22. The system of claim 16, wherein the proxy server comprises a secure web gateway.

* * * * *